CONTROL CIRCUIT FOR CATHODE-RAY OSCILLOSCOPES

Filed Oct. 27, 1948 2 SHEETS—SHEET 1

INVENTOR
PHILIP W. CRIST
BY
Paul B. Hunter
ATTORNEY

May 6, 1952 P. W. CRIST 2,595,228

CONTROL CIRCUIT FOR CATHODE-RAY OSCILLOSCOPES

Filed Oct. 27, 1948 2 SHEETS—SHEET 2

INVENTOR
PHILIP W. CRIST
BY
Paul B. Hunter
ATTORNEY

Patented May 6, 1952

2,595,228

UNITED STATES PATENT OFFICE 2,595,228

CONTROL CIRCUIT FOR CATHODE-RAY OSCILLOSCOPES

Philip W. Crist, Hempstead, N. Y., assignor to The Sperry Corporation, Great Neck, N. Y., a corporation of Delaware Application October 27, 1948, Serial No. 56,778

9 Claims. (Cl. 315—22)

This invention relates to control circuits for cathode-ray oscilloscopes and particularly to sweep and intensity voltage generators for controlling the electron beam of a cathode-ray tube.

Numerous arrangements have been devised for generating non-sinusoidal oscillations adapted to cause the electron beam in a cathode-ray tube to be deflected by electrostatic means across the screen of the tube at substantially constant speed. Conventional arrangements employ a relaxation oscillator or a complex vacuum tube circuit to generate a deflection potential whose magnitude changes in a substantially linear manner with respect to time. However, the maximum sweep speed obtainable with conventional sweep generators is usually limited by the stray capacities introduced by the component parts of the circuit, and therefore such oscillators are not satisfactory for the generation of sweep signals for oscilloscopes in which very high electron beam sweep speeds must be attained.

It is an object of the present invention to provide an improved means for generating an electrostatic field adapted to cause the electron beam of a cathode-ray tube to sweep across the screen of the tube at substantially constant speed.

It is an additional object of this invention to provide a means for generating sweep voltage impulses adapted to cause the electron beam of a cathode-ray tube to attain very high sweep speeds.

It is a further object of this invention to provide an improved means for generating intensity gate voltage impulses adapted to cause the electron beam of a cathode-ray tube to strike the screen of the tube only during the time intervals in which sweep voltage impulses are applied to the deflection plates of the tube.

Figure 5:
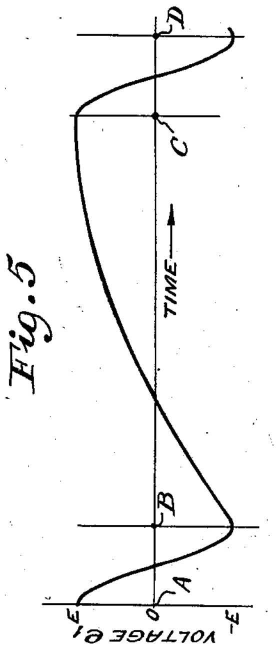
Figure 6:
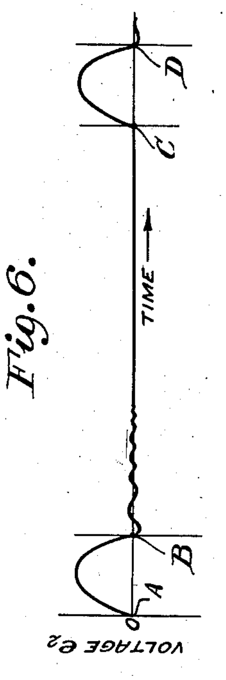
Figure 7:
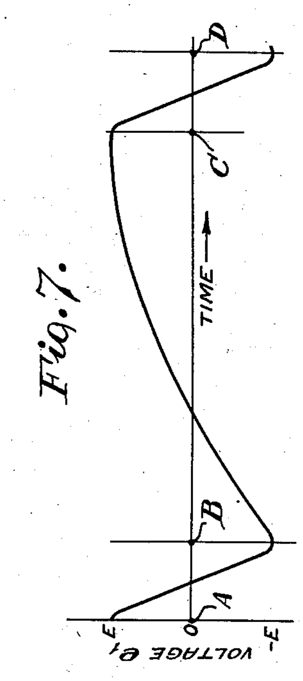
Figure 8:
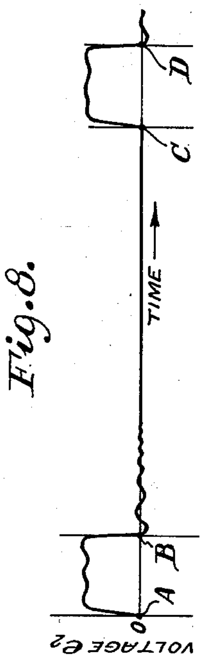
Figure 1:
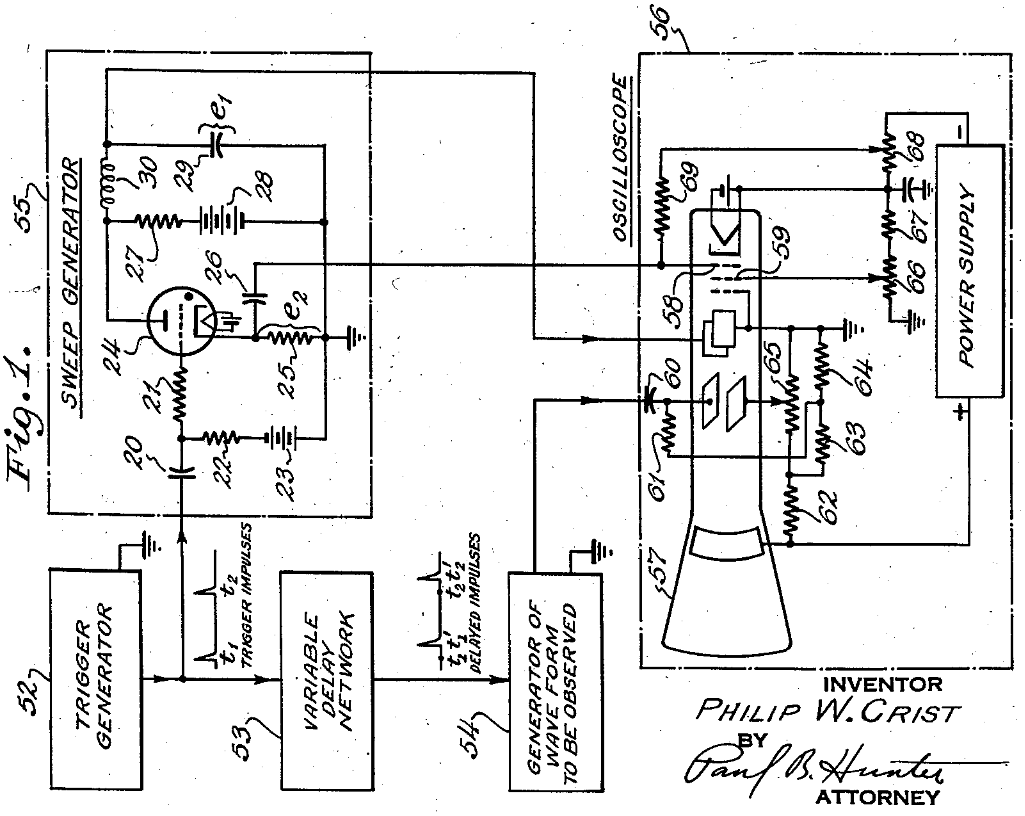
Figure 2:
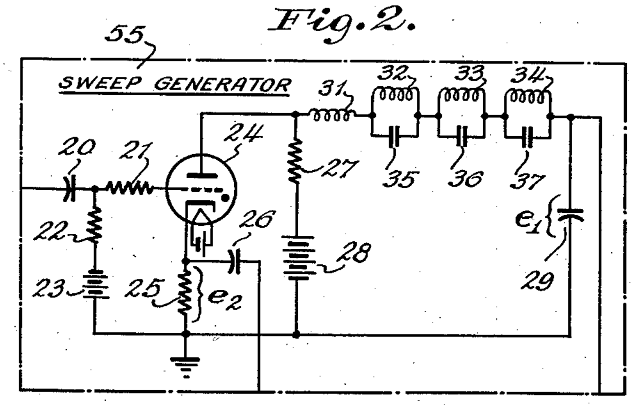
Figure 3:
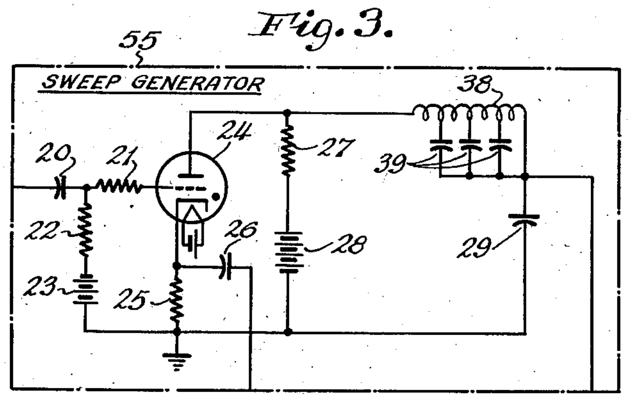
Figure 4:
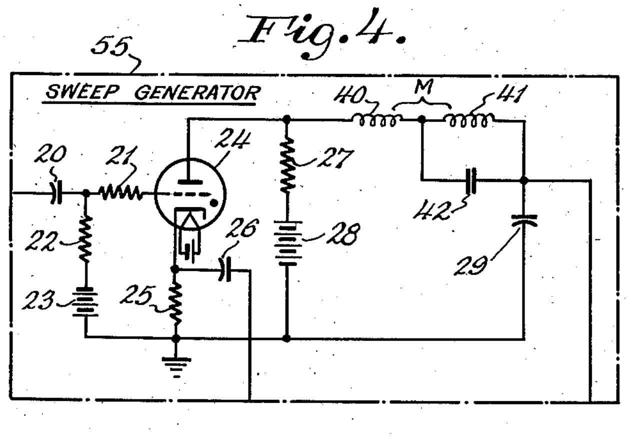

These and other objects of the invention will be apparent from the following description, the appended claims, and the drawings, in which, Fig. 1 is a diagram of an oscilloscope, the control circuit for generating the sweep and intensity gate voltages, and block diagrams of conventional devices associated therewith;

Figs. 2, 3, and 4 illustrate modifications of the sweep generator indicated in Fig. 1;

Fig. 5 indicates a typical voltage-time curve for the deflection voltage produced by the sweep generator disclosed in Fig. 1;

Fig. 6 indicates a typical voltage-time curve for the intensity gate voltage produced by the sweep generator disclosed in Fig. 1;

Fig. 7 indicates a typical voltage-time curve for the deflection voltage produced by the sweep generator disclosed in Fig. 2; and Fig. 8 indicates a typical voltage-time curve for the intensity gate voltage produced by the sweep generator disclosed in Fig. 2.

The objects of this invention are obtained by employing potentials developed by a condenser discharge current in an oscillatory circuit to control the sweep and intensity of the electron beam of a cathode-ray tube. The voltage variation across the condenser is employed as the sweep voltage, while a voltage developed across a resistance in the path of the discharge current is employed as an intensity gate impulse. Special means are provided to insure that the discharge current is both rapid and substantially constant and that the voltage variation across the condenser changes in a substantially linear manner.

Fig. 1 shows an embodiment of the invention wherein sweep generator 55 and oscilloscope 56 are under the control of trigger generator 52. The trigger generator serves to generate a series of steep-wavefront electrical impulses at a predetermined frequency such as 400 impulses per second, and these impulses are applied directly to sweep generator 55 and variable delay network 53. The trigger impulses of voltage developed by trigger generator 52 are indicated adjacent to the connection between the trigger generator and variable delay network 53. The variable delay network serves to introduce a controllable delay time between the impulses introduced by generator 52 and those produced at the output of the variable delay network. The time relationship between the trigger impulses introduced by trigger generator 52 and those produced at the output of variable delay network 53 is indicated on the drawing, the delayed impulses being indicated adjacent to the connection between variable delay network 53 and generator 54. Generator 54 is actuated by the delayed impulses and serves to generate the phenomenon whose wave form is to be observed on the screen of cathode-ray tube 57. The output of generator 54 is connected across the vertical deflection plates of cathode-ray tube 57 through condenser 60 and potentiometer 65 in a conventional manner.

Sweep generator 55 includes a grid-controlled gas discharge tube 24 which is a fast acting tube such as type 884 manufactured by the Radio Corporation of America. The grid of this tube is coupled to trigger generator 52 through a condenser 20. Tube 24 is normally biased to cut-off by battery 23 which is connected between the cathode and control grid of the tube through resistors 21, 22 and 25. This bias is adjusted so that the tube is caused to become conducting each time a trigger impulse is applied to the control grid through condenser 20. The plate potential for the tube is supplied by battery 28 through resistor 27, and these two circuit elements are connected across serially connected condenser 29 and inductance 30. The resistance of resistor 27 is many times larger, by a ratio of 50 to 1 for example, than the surge impedance (i. e., $\sqrt{L/C}$) of serially connected inductance 30 and condenser 29. The sweep voltage for the horizontal deflection plates of cathode ray tube 57 is developed across condenser 29, and this voltage is designated by the symbol $e_1$ in the drawings.

The intensity gate voltage which is applied to control electrode 58 of the cathode-ray tube through condenser 26 is developed as a voltage drop across resistor 25 and is designated by the symbol $e_2$ in the drawings. The resistance of resistor 25 is several times less than the surge impedance of inductance 30 and condenser 29, as by a ratio of 1 to 20 for example; therefore, the closed circuit comprising inductance 30, condenser 29, resistor 25, and the interelectrode space between the anode and cathode of tube 24 is oscillatory. The intensity gate voltage is applied between control electrode 58 and the cathode of tube 57 in opposite polarity to the negative bias applied between the control electrode and cathode by potentiometer 68 through series resistor 69, and the circuit constants are proportioned so that the maximum value of the intensity gate voltage developed across resistor 25 partly counteracts the negative bias and causes the intensity of the electron beam of tube 57 to increase to substantially the maximum value allowable without damaging the screen of tube 57.

Oscilloscope 56 is a conventional type adapted to be employed in systems wherein the voltage applied between the horizontal deflection plates is periodically increased in a linear manner and then restored to normal, and the voltage applied between the vertical deflection plates corresponds to the phenomenon whose wave form is to be observed. The centering voltages for the vertical deflection plates are provided by resistors 62, 63 and 64 and potentiometer 65, all of which are connected to the power supply and employed as a voltage divider. Resistor 61 serves to connect the upper vertical deflection plate to the voltage divider and also serves to increase the resistance in the circuit interconnecting the two vertical deflection plates. No provision is made in this embodiment of the invention for applying centering voltages to the horizontal deflection plates; however, horizontal centering may be provided in a conventional manner if it should be required in some systems in which this invention may be employed. Resistor 67 and potentiometers 66 and 68 are connected to the power supply and comprise another voltage divider. The voltage applied to focusing electrode 59 is supplied by potentiometer 66, and the voltage applied to control electrode 58 is provided by potentiometer 68 and connected to the control electrode through resistor 69. The fixed bias supplied by potentiometer 68 serves to make the control electrode of negative polarity with respect to the cathode of tube 57 and this fixed bias is sufficient to cause control electrode 58 to extinguish the flow of the electron beam from the cathode to the screen of the tube.

Before the first trigger impulse is generated, gas tube 24 is in a non-conducting condition since it is biased to cut-off by battery 23. Neglecting leakage currents, when the tube is in a non-conducting condition no current flows through resistors 25 and 27, and voltage $e_1$ across condenser 29 equals the voltage of battery 28, while the voltage drop $e_2$ across resistor 25 is zero. Since the voltage across condenser 29 is applied to the horizontal deflection plates of the cathode-ray tube, it follows that an electron beam within tube 57 would be deflected to the extreme left side of the screen. However, since the fixed bias applied to the control electrode by potentiometer 68 is sufficient to cut off the electron beam and since no intensity gate voltage appears across resistor 25 at this time to partly counteract the fixed bias, there is no electron beam at this instant which can be affected by the electrostatic field caused by the voltage applied to the horizontal deflection plates. Thus, a spot does not appear on the screen of tube 57 at this time.

When the first trigger impulse is generated by trigger generator 52 at time $t_1$, the impulse serves to reduce or remove the bias between the grid and cathode of gas tube 24 so that the tube becomes conducting. Because of the charge stored in condenser 29, current flows from ground through condenser 29, inductance 30, the interelectrode space between the plate and cathode of tube 24, and resistor 25 to ground. The currents flowing in the branch of the network comprising battery 28, resistor 27, inductance 30, and condenser 29 and in the branch comprising battery 28, resistor 27, the interelectrode space between the plate and cathode of tube 24, and resistor 25 may be disregarded since the impedance of each of these branches is many times larger than the impedance of the branch discussed above. When condenser 29 has completely discharged, the energy stored in inductance 30 serves to maintain the flow of current in the condenser discharge path for a short interval of time and condenser 29 reverses its initial charge. When the voltage across condenser 29 reaches its maximum negative value, the magnitude of the transient current through the discharge path is zero, and the transient is interrupted since current ceases to flow through tube 24 because the interelectrode space between the plate and cathode of tube 24 is a unilateral conductor.

As soon as the transient current is interrupted, the condenser begins to charge in an exponential manner, the charging circuit comprising condener 29, inductance 30, resistor 27, and battery 28. The resistance of resistor 27 is much larger than the surge impedance of inductance 30 and condenser 29; therefore, the charging circuit is non-oscillatory. When condenser 29 is charged so that the voltage across the condenser substantially equals and is the same polarity as the voltage of battery 28, the sweep generator is in condition to receive the next trigger impulse which occurs at time $t_2$. The sweep generator responds to this second impulse and the subsequent impulses in the same manner as it responded to the first impulse.

It will be observed that the time required to restore the charge in condenser 29 may be reduced somewhat by connecting serially connected battery 28 and resistor 27 directly across condenser 29. With such an arrangement, the circuit functions in substantially the manner as described above.

As discussed above, the resistance of resistor 25 is small compared to the surge impedance so that the branch of the circuit comprising resistor 25, the interelectrode space between the plate and cathode of tube 24, condenser 29, and inductance 30 tends to be oscillatory. The combined impedance of resistor 25 and the impedance offered by the interelectrode space between the plate and cathode of tube 24 has a negligible effect upon the wave form of the transient current which is caused to flow when condenser 29 discharges and charges to a reverse voltage; therefore, the effect of the circuit elements other than condenser 29 and inductance 30 in the discharge circuit may be disregarded for the purpose of determining the wave form of the discharge current and the natural frequency of the discharge path. It follows that the half-cycle current impulse which flows is substantially sinusoidal and that very little power is consumed by resistive losses. The half-cycle voltage impulse which appears across the condenser 29 is also substantially sinusoidal and is approximately 90° ahead of the half-cycle of current in time-phase.

The half-cycle current impulse causes a voltage drop across resistor 25, and, since this voltage is in phase with the current, the intensity gate voltage developed across resistor 25 lags the sweep voltage developed across condenser 29 and 90° in time-phase. Thus, mathematically, the magnitude of the half-cycle intensity gate impulse is directly proportional to the rate of change of the magnitude of the half-cycle sweep voltage impulse.

It will be observed that the shunt effect of serially connected battery 28 and resistor 27 upon the wave form produced by and the natural frequency of the discharge circuit has not been considered in the foregoing discussion. This is justified since the combined impedance of these circuit elements is many times larger than the impedance of the discharge circuit which they are connected across.

At time $t_1'$ which occurs slightly later than $t_1$, variable delay network 53 reproduces the impulse generated by trigger generator 52. This delayed impulse serves to cause generator 54 to generate the electric phenomenon whose wave form is to be observed on the screen of cathode-ray tube 57. The delay introduced by network 53 determines the interval of time represented by $t_1'-t_1$, and adjustment of the delay is employed to synchronize the signals generated by generators 54 and 55. Generator 55 must be actuated by a trigger impulse a short time before generator 54 is actuated since a finite time is required to cause the sweep generator to generate a sweep signal after the trigger impulse occurs. When the two series of trigger impulses are properly synchronized, the pattern which appears on the screen of the cathode-ray tube is a plot of the wave form of the phenomenon to be studied with respect to time since the magnitude of the potential applied to the vertical deflection plates is proportional to the wave form of the phenomenon to be studied and the potential applied to the horizontal deflection plates is proportional to time.

Fig. 5 indicates a typical curve for the deflection voltage $e_1$ developed across condenser 29. The portion of the curve from A to B along the time axis represents the magnitude and polarity of the voltage developed across condenser 29 during the interval of time that tube 24 is in a conducting condition. The portion of the curve from B to C represents the magnitude and polarity of the voltage developed across condenser 29 during the interval of time that tube 24 is in a non-conducting condition and while the condenser is recharging to its initial condition. The portion from C to D represents the second interval of time that tube 24 is in a conducting condition.

Neglecting the effect of the resistance of the discharge path comprising condenser 29, inductance 30, the interelectrode space between the plate and cathode of tube 24, and resistance 25, the natural frequency of the discharge path is represented as follows:

$$f=\frac{1}{2\pi\sqrt{LC}}$$

where $f$ is the natural frequency in cycles per second, L is the inductance of inductance 30, and C is the capacitance of condenser 29. In Fig. 5 the wave form of the curve indicated from A to B and C to D along the time axis may be expressed as $$e_1=E\cos\frac{t}{\sqrt{LC}}$$

and the wave form of the curve from B to C along the time axis is expressed as $$e_1=E-2Ee^{\frac{-t}{R_{27}C}}$$

where E is the voltage across battery 28, $t$ is time, $R_{27}$ is the resistance of resistor 27, and $e$ is the base of natural logarithms.

Fig. 6 indicates a typical curve for the intensity gate voltage $e_2$ which is developed across resistor 25. The portion of the curve from A to B along the time axis represents the intensity gate voltage developed while tube 24 is in a conducting condition. The portion of the curve from B to C represents the time interval during which tube 24 is in a non-conducting condition, and again the portion from C to D represents the voltage developed when tube 24 is conducting. The portion of the curve from A to B and C to D may be represented as follows:

$$e_2=E\frac{R_{25}}{\sqrt{L/C}}\sin\frac{t}{\sqrt{LC}}$$

where $R_{25}$ is the resistance of resistor 25, and the other symbols are as designated above for the discussion of Fig. 5. The time interval from A to B and C to D along the time axis for both Figs. 5 and 6 equals one-half the natural period of the oscillatory circuit, i. e. $\pi\sqrt{LC}$ seconds.

From an inspection of the curves in Fig. 5 it is apparent that sweep voltage $e_1$ which is applied between the horizontal deflection plates of tube 57 is not of linear wave form. However, the electron beam is caused to sweep across the usable middle section of the screen of the cathode-ray tube in a substantially linear manner. Also, it is apparent that the intensity gate voltage is of sinusoidal wave form and therefore does not reach sufficient magnitude to sufficiently reduce the fixed bias so as to permit the electron beam to pass through the tube and strike the screen until a short interval of time after the sweep voltage is initiated. When the magnitude of the intensity gate voltage decreases, the electron beam is again cut off before the sweep voltage has completed its swing. Thus, the electron beam does not strike the edge of each side of the screen, and it is not permitted to strike any part of the screen during the time required for the sweep generator to restore to normal.

Suitable values for the circuit constants in the sweep generator as described above employed to sweep the electron beam across the screen of a type 5JP1 cathode-ray tube as manufactured by Allen B. DuMont Laboratories at a rate of 8 inches per microsecond, are as follows:

$C_{20}$ 50 micromicrofarads
$C_{26}$ .001 microfarad
$C_{29}$ 86.2 micromicrofarads
$R_{21}$ 560,000 ohms
$R_{22}$ 30,000 ohms
$R_{25}$ 110 ohms
$R_{26}$ 100,000 ohms
$L_{30}$ 417 millihenries
$E_{23}$ 45 volts
$E_{28}$ 300 volts The resistance of charging resistor 27 is governed by the repetition rate at which the sweep voltage is generated and the capacitance to be charged. If this resistance is too low, the current which this branch of the circuit causes to flow through tube 24 when the tube is in a conducting condition will prevent the tube from extinguishing and becoming non-conducting after a half-cycle of current has passed through the discharge path. If the resistance is too high, the sweep voltage will be reduced if the sweep voltage impulses are repeated at a high rate. The limits within which the resistance must fall may be determined experimentally by using a variable resistance to determine when the phenomena described above occur.

A sweep generator of this type is capable of causing the electron beam of a cathode-ray tube to sweep across the screen of the tube at a very high speed. Sweep speeds in excess of 30 inches per microsecond have been obtained, and at these speeds it is possible to examine wave fronts as short as .04 microsecond in duration with reasonable accuracy. The maximum sweep speed obtainable is limited at present by the cathode-ray tubes available.

In various applications, it is desirable that the electron beam sweep across the entire screen of the cathode-ray tube at a constant speed. This requires that a voltage be applied between the horizontal deflection plates which increases in a linear manner. The modifications of the sweep generator as indicated in Figs. 2, 3 and 4 are capable of repeatedly producing voltage impulses of this type. Also, these modifications of the sweep generator are capable of generating intensity gate voltage impulses which are of substantially rectangular wave form. This result is attained by inserting a pulse-forming network in series with the discharge circuit for condenser 29. There are several well-known methods for causing the wave form of the current resulting from the discharge of a condenser in an oscillatory circuit to attain a rectangular wave form, and the networks indicated in Figs. 2, 3 and 4 are three of the better known methods.

It will be observed in Fig. 2 that inductances 31, 32, 33 and 34 and condensers 29, 35, 36 and 37 comprise the oscillatory elements of the discharge circuit and that this embodiment of the invention differs from that disclosed in Fig. 1 in that inductances 32, 33 and 34 and condensers 35, 36 and 37 have been added to attain the desired discharge current wave form. The wave forms of the sweep voltage and discharge current produced by the apparatus is indicated in Figs. 7 and 8 respectively. As before, the magnitude of the half-cycle intensity gate impulse is directly proportional to the rate of change of the magnitude of the half-cycles sweep voltage impulse. The wave form of the sweep voltage impulse is substantially linear except during a very short interval of time at the beginning and end of the impulse, and the wave form of the intensity gate voltage impulse accordingly is substantially rectangular. It will be observed that the intensity gate impulse is employed to cause the electron beam of the cathode-ray tube to strike the screen of the tube only during the intervals of time in which the sweep voltage impulses change in a linear manner. Thus, the electron beam is not permitted to strike the extreme edge of each side of the screen of the cathode-ray tube nor is it permitted to strike any part of the screen during the time required for the sweep generator to restore to normal.

The oscillatory circuit comprises inductance 38 and condensers 29 and 39 in Fig. 3 and inductances 40 and 41 and condensers 29 and 42 in Fig. 4. It will be observed that inductance 40 is electromagnetically coupled to inductance 41 in the embodiment of the invention disclosed in Fig. 4. Each of these two embodiments illustrate alternative means for attaining the same result as that obtained by the apparatus disclosed in Fig. 2. The operation of the apparatus embodiments disclosed in Figs. 2, 3 and 4 is the same as that discussed above in connection with Fig. 1.

Suitable values for the pulse-forming network and condenser 29 indicated in Fig. 2 adapted to generate a substantially linear sweep voltage of 2 microseconds duration are as follows:

$C_{29}$ 220 micromicrofarads
$C_{35}$ 130 micromicrofarads
$C_{36}$ 140 micromicrofarads
$C_{37}$ 160 micromicrofarads
$L_{31}$ 390.5 millihenries
$L_{32}$ 446 millihenries
$L_{33}$ 100.5 millihenries
$L_{34}$ 37 millihenries It will be apparent to one skilled in the art that various arrangements may be employed instead of the pulse-forming networks shown. Also, it will be apparent that various other arrangements may be employed for synchronizing the sweep voltage generator with the generator of the wave form which is to be observed on the screen of the cathode-ray tube.

Although specific embodiments of this invention have been shown and described, it will be apparent that various modifications may be made therein without departing from the scope thereof as defined by the appended claims.

What is claimed is:

1. In combination, a cathode-ray tube employing electrostatic fields for the deflection of an electron beam, a capacitor, a low impedance connected in series with said capacitor, a high impedance circuit for charging said capacitor, an oscillatory circuit including said capacitor and said low impedance, said serially connected capacitor and impedance having a surge impedance several times larger than the resistance of the oscillatory circuit, means for causing said capacitor to discharge and recharge to a potential of opposite polarity through said oscillatory circuit during a time interval equal to one-half the natural period of said oscillatory circuit, interconnecting means for applying the voltage developed across said capacitor to a pair of the deflection plates of said cathode-ray tube, means for applying a fixed bias between the control electrode and cathode of said cathode-ray tube, and interconnecting means for applying the voltage drop developed across said low impedance between the control electrode and cathode of said cathode-ray tube in opposite polarity to said fixed bias.

2. In combination, a cathode-ray oscilloscope employing electrostatic fields for the deflection of an electron beam; a capacitor; an inductor; a resistor; a unilateral discharge device; a non-oscillatory circuit for charging said capacitor; an oscillatory circuit including said capacitor, inductor, resistor and discharge device, said capacitor and inductor being connected in series and having a surge impedance several times larger than the resistance of the oscillatory circuit; means for causing said discharge device to be normally non-conducting; means for periodically causing conduction through said discharge device during time intervals equal to one-half the natural period of said oscillatory circuit; interconnecting means between said capacitor and a pair of the deflection plates of the cathode-ray tube of said oscilloscope for applying the voltage across said capacitor to the deflection plates; means for applying a fixed bias between the control electrode and cathode of the cathode-ray tube of said oscilloscope; and interconnecting means between said resistor and the control electrode and cathode of the cathode-ray tube of said oscilloscope for applying the voltage drop developed across said resistor between the control electrode and cathode in opposite polarity to said fixed bias.

3. Oscilloscope apparatus for affording very rapid sweep speeds comprising a cathode-ray tube employing electrostatic fields for the deflection of an electron beam, a source of fixed bias of sufficient magnitude to extinguish the electron beam of said cathode-ray tube; a capacitor; an inductor; a resistor; a grid-controlled gas discharge tube; a resonant circuit including said capacitor, inductor, resistor, and the interelectrode space between the anode and cathode of said discharge tube, all serially connected; said resonant circuit having a surge impedance several times larger than the resistance of said resistor; a source of potential; a high impedance circuit connecting said capacitor across said source of potential, said source of potential being of a polarity to cause the anode of the discharge tube to be of positive polarity with respect to the cathode; a source of bias for causing said discharge tube to be normally in a non-conducting condition; means for recurrently initiating conduction through said discharge tube; interconnecting means for connecting said capacitor across a pair of the deflection plates of said cathode-ray tube; and interconnecting means for applying the voltage impulse developed across said resistor between the control electrode and cathode of said cathode-ray tube in opposite polarity to said fixed bias.

4. In combination, a cathode-ray oscilloscope having an electrostatic deflection circuit and a beam control electrode circuit, a capacitor and an inductor connected in series, a gaseous discharge device connected to said serially connected capacitor and inductor, means for periodically rendering said discharge device conductive for rapidly discharging said capacitor through said inductor, said serially connected capacitor and inductor having a surge impedance several times larger than the resistance of the discharge path for said condenser, means for recharging said capacitor recurrently following the successive discharges thereof, means connecting said capacitor in said oscilloscope deflection circuit, an impedance connected in series with said gaseous discharge device, and means connecting said impedance in said oscilloscope beam control electrode circuit for actuating the electron beam of said cathode-ray oscilloscope only during the rapid discharges of said capacitor.

5. The combination of claim 4, wherein said impedance is a low resistance.

6. In combination, a cathode-ray oscilloscope having an electrostatic deflection circuit and a beam control circuit, a capacitor and an inductor and a wave-shaping network connected in series, a gaseous discharge device connected to said serially connected capacitor and inductor and wave-shaping network, means for periodically rendering said discharge device conductive for rapidly discharging said capacitor through said inductor and wave-shaping network, means for recharging said capacitor recurrently following the successive discharges thereof, means connecting said capacitor in said oscilloscope deflection circuit, an impedance connected in series with said gaseous discharge device, and means connecting said impedance in said oscilloscope beam control electrode circuit for actuating the electron beam of said cathode-ray oscilloscope only during the rapid discharges of said capacitor.

7. Apparatus for generating rapid sweep voltage excursions at predetermined time intervals and gate pulses substantially coextensive therewith, comprising a gaseous discharge tube having a cathode and an anode, an inductor, a capacitor, and a low impedance connected in series between said cathode and anode, said inductor and capacitor having a very short oscillatory period, means normally biasing said tube to cut-off, means for charging said capacitor, means for recurrently initiating conduction through said tube at a recurrence period much longer than said oscillatory period for initiating discharges of said capacitor, and a pulse-forming network coupled to said capacitor for rendering the discharge rate of said capacitor substantially uniform, whereby said rapid sweep voltage excursions are produced across said capacitor and said gate pulses are produced across said low impedance.

8. A generator for generating an impulse of voltage of a magnitude which changes in a substantially linear manner with respect to time comprising a capacitor; a grid-controlled gas discharge tube; a pulse-forming network including said capacitor; a resonant circuit including said pulse-forming network and the interelectrode space between the anode and cathode of said discharge tube, said resonant circuit being adapted to cause the capacitor discharge current to be of substantially rectangular wave form; means for causing said discharge tube to be normally non-conducting; means for recurrently initiating conduction through said discharge tube; and means for recharging said capacitor recurrently following the successive discharges thereof.

9. A generator for generating an impulse of electric current of substantially rectangular wave form comprising a capacitor, a resistor, a unilateral discharge device, and a pulse-forming network including said capacitor, all serially connected in a closed oscillatory circuit; a high impedance circuit for charging said capacitor; means for causing said discharge device to be normally non-conducting; and means for causing conduction through said discharge device for a time interval equal to one-half the natural period of said resonant circuit, thereby causing said capacitor to discharge and recharge to a potential of opposite polarity to the initial potential, said oscillatory circuit being adapted to cause the voltage appearing across said capacitor during said time interval to be of substantially linear wave form.

PHILIP W. CRIST.

REFERENCES CITED

The following references are of record in the file of this patent:

UNITED STATES PATENTS

| Number | Name | Date |
|---|---|---|
| 2,294,015 | Salb et al. | Aug. 25, 1942 |
| 2,457,744 | Sturm | Dec. 28, 1948 |